Figure 3:
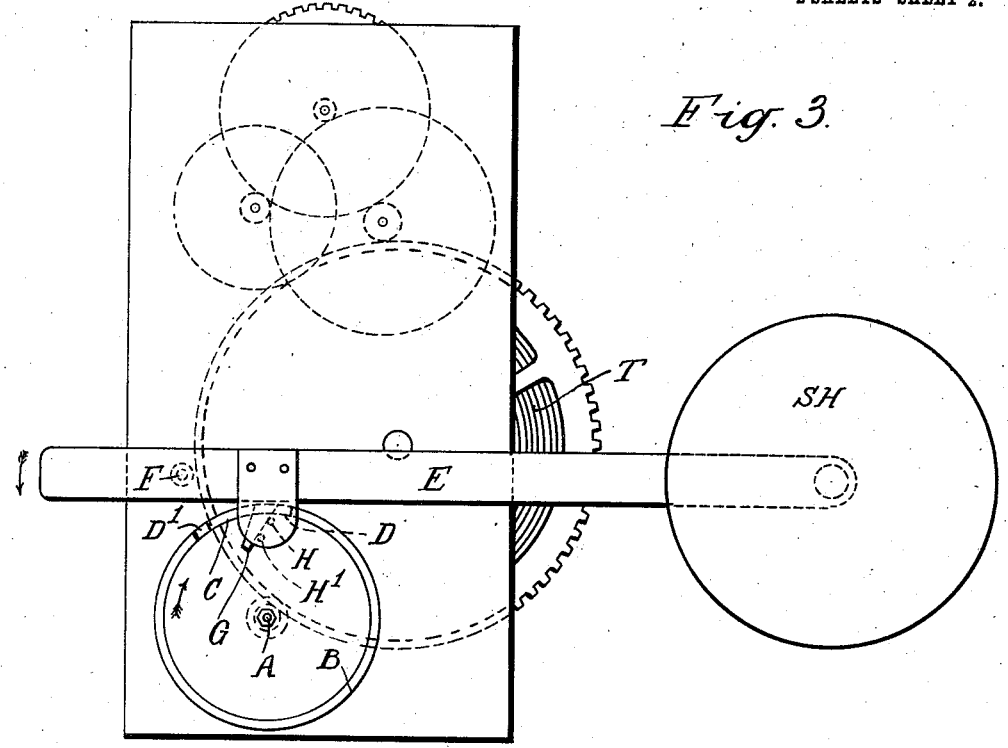

No. 857,124. PATENTED JUNE 18, 1907.
T. TORDA.
PHOTOMETER.
APPLICATION FILED FEB. 26, 1906.
2 SHEETS—SHEET 1.
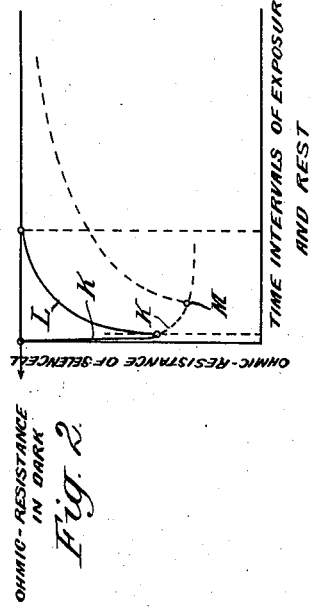
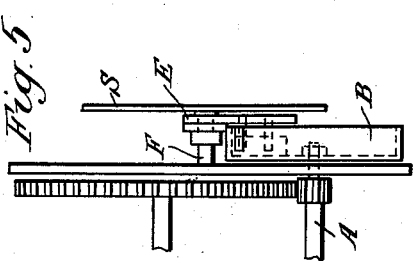
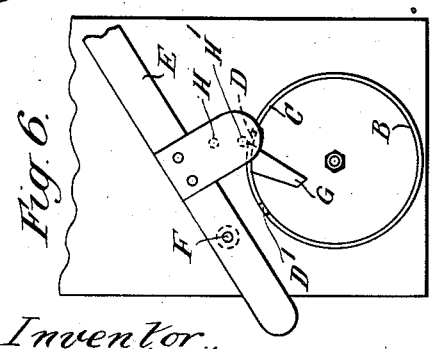
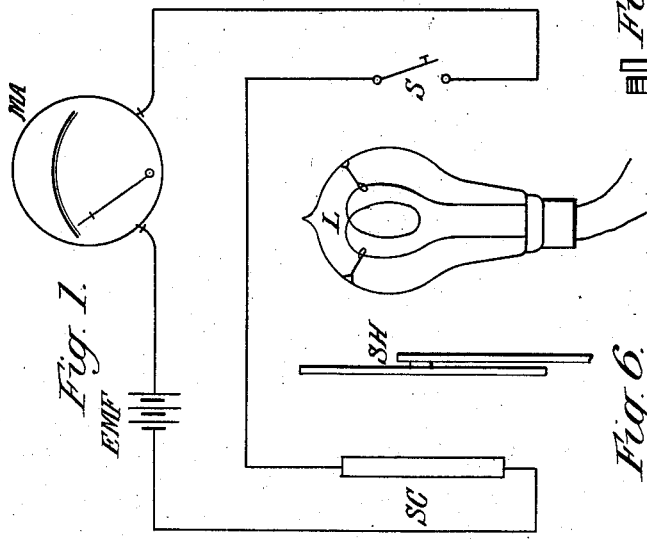

No. 857,124.

PATENTED JUNE 18, 1907.

T. TORDA.
PHOTOMETER.
APPLICATION FILED FEB. 26, 1906.

2 SHEETS—SHEET 2.

Witnesses.
Samuel Percival
Frederick Cleveland.

Inventor
Theodore Torda.
By Wheatley Mackenzie
attorneys.

UNITED STATES PATENT OFFICE.

THEODORE TORDA, OF LONDON, ENGLAND.

PHOTOMETER.

No. 857,124.  Specification of Letters Patent.  Patented June 18, 1907.

Application filed February 26, 1906. Serial No. 303,002.

*To all whom it may concern:*

Be it known that I, THEODORE TORDA, a subject of the King of Hungary, whose post-office address and residence is Chescombe, Netheravon Road, Chiswick, London, England, have invented certain new and useful Improvements in Photometers; and I do hereby declare the following to be a full, clear, and exact description of the invention, such as will enable others skilled in the art to which it appertains to make and use the same.

This invention which consists of improvements in photometers, for measuring the intensity of a light source, such as that of electric incandescent lamps, arc lamps and the like, relates to those photometers which comprise a measuring or recording instrument and a light sensitive cell of selenium, the electrical resistance of which upon being exposed from darkness to the light rays is altered and recorded, the object of the present invention being to provide such photometers with an automatic shutter arrangement by the use of which the time of exposure is fixed and the correct amount of time for recuperation allowed after each exposure, not at the will of the operator but entirely automatically, the time of recuperation of the selenium cell being dependent upon the length of the previous exposure thus insuring a greater accuracy than has previously been obtained by apparatus of this class.

One class of photometers hitherto in use have been based on the so called comparative method, using a standard lamp for comparing same with the one under test. This comparative photometry is very tiring, as for each measurement the operator must apply his own judgment and strain his eyes in the comparative observation, whereby a personal error comes into play, and the longer the testing lasts the more tired the operator gets and the more his errors increase, while at the same time the influence of the variations of the standard light affects each measurement and causes repeated errors.

In the case of the present improvements, the above disadvantages do not exist, as the reading is taken from a measuring instrument, and the use of the standard lamp comes into play only once, when the scale of the direct reading instrument is permanently established by means of a very careful comparative test.

In the case of the comparative photometry, great care also requires to be taken to prevent the eyes from being exposed to the outside light, thereby necessitating a dark room, while in the case of the usual designs of my improved photometer, the lamp is during the test, inclosed in a light tight box which enables the measurements to be taken in broad daylight.

The use of the comparative photometer is irksome and demands a certain skill and knowledge from the operator, while in the case of my improved photometer the reading being absolutely direct, requires no special knowledge.

In order that my invention may be clearly understood and more easily carried into practice I have appended hereunto a sheet of drawings upon which I have illustrated the nature of my said invention.

Figure 4:
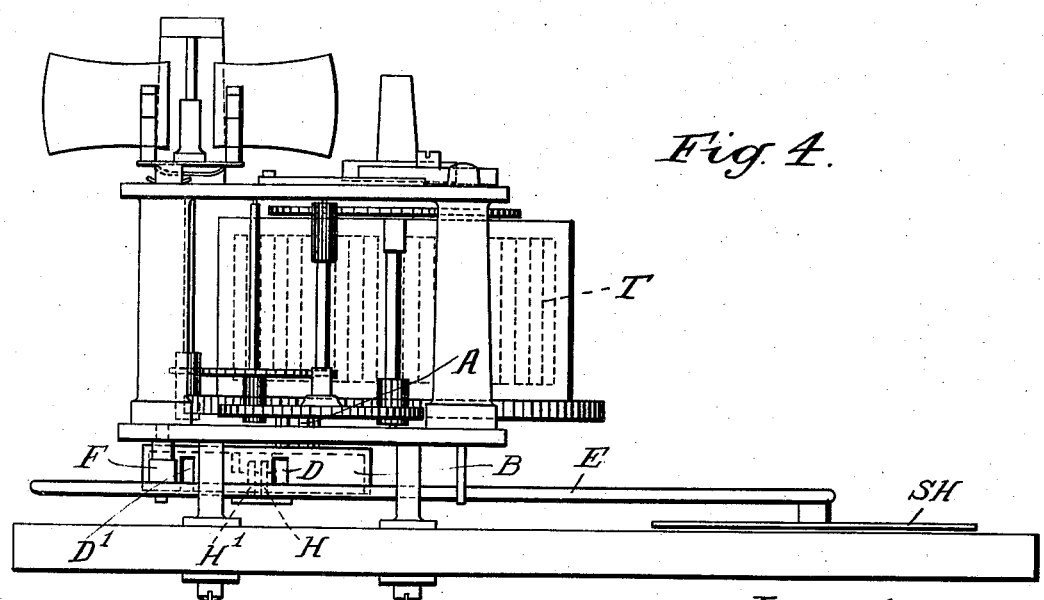

Figure 1 is a diagram illustrating the schematic arrangement and connection of my photometers. Fig. 2 is a diagram illustrating the variation of the ohmic resistance in terms of time exposure and rest in darkness of a selenium cell. Fig. 3 is an elevation of one form of automatic mechanism for use in operation of same. Fig. 4 is a plan of Fig. 3. Fig. 5 is an end elevation of Fig. 3. Fig. 6 is a part elevation similar to that of Fig. 3 but illustrating the lever in the open position.

With reference to Fig. 1 the selenium cell is placed in the circuit of a constant electromotive force, so as to carry according to its dark resistance a certain electric current when the switch S closes the circuit, and which current produces a deflection on the galvanometer or milliampere meter M A. Taking this deflection which corresponds to the dark resistance as zero point, the measurement of the light effect is obtained by exposing the selenium cell S C to the light rays of the lamp L, and through the light effect the resistance of the selenium cell S C and therewith the resistance of the closed circuit, will decrease according to the value of the lighting intensity, and the milliampere meter M A will then give greater deflection. With the measuring of the difference in the deflections between the dark and the light exposed conditions, a direct reading of the lighting intensity in candle power, or equal, is thereby obtained.

In Fig. 1 the schematic arrangement and connections of the selenium photometer is given, whereby S H represents the shutter, hereafter referred to, and by the operation of which I obviate the difficulty hitherto experienced in obtaining a practical and commercial selenium photometer and which has been due to the fact that the selenium when once exposed to the light effect takes a long time before it regains its original dark resistance, so as to be suitable for a new exposure.

Fig. 2 illustrates the characteristic curves of a selenium cell illustrating the retardation property, in regaining its original state. These characteristic curves represent the ohmic resistance, of the selenium cell in terms of both time of the exposure, and the rest in darkness required under a certain amount of light. The characteristic curve K indicates that at the time of opening the selenium cell, a very short time is occupied in effecting a considerable alteration of the resistance and that a further exposure effects only a slight degree of variation of resistance.

The characteristic curve K also shows a more or less sharp bend, and this, together with the curve L indicates that an exposure reaching before or about to the knee, will effect such a molecular stress in the selenium cell, that the same will regain in a comparatively short time of darkness its original state, but if the selenium cell is exposed such a length of time that the curve reaches beyond the knee to say point M of curve K, then the molecular stress is so excessive that it takes many minutes or hours before it reaches its original point.

Recognizing, and having ascertained the fact that a reading taken after a short or momentary exposure gives a reliable result, as regards the light effect, while it does not affect the molecular conditions of the selenium cell I therefore employ an automatic arrangement which fixes the necessary short exposure and terminates same through its automatic action, and fixes a certain time of rest in darkness, to enable the cell to regain its original properties in order to be ready for a new reading.

The main object of the automatic shutter S H in Fig. 1 is that the resistance alteration of the selenium cell, exposed from darkness to light, shall take place to a certain degree only, the time of exposure being governed by the permissible molecular stress; and by the corresponding time of recuperation and the necessary time of taking a reading on the galvanometer or milliampere meter.

To obtain the above conditions of short exposure and fixed time of rest in darkness, I employ an apparatus and automatic arrangement, a constructional example of which is hereafter described.

The light tight box contains a selenium cell S C, constant electromotive force in the form of small cells, a small switch or press contact S, a galvanometer or milliampere meter M A, auxiliary regulating resistances when required, and an automatic shutter with mechanical arrangement, as represented in Figs. 3, 4, 5 and 6 which illustrate one form of the automatic arrangement but to which, however, I do not bind myself.

In the use of the apparatus the action is as follows:—A light source L is placed at a proper distance, before the screen which covers the whole of the partition containing the selenium cell, after which the switch S is closed in the cell circuit and at the same time the screen S H is opened, when the effect of the light upon the selenium cell causes a deflection on the milliampere meter to take place, the reading of which being taken the screen closes automatically. The deflection measured from the "zero point" indicates the lighting intensity upon a certain scale, the whole operation being completed in a few seconds.

With reference to the constructional sketch of the automatic shutter illustrated by Figs. 3, 4, 5 and 6, a strong spring T actuates the spindle A through a smalll number of cog wheels, in such a manner that the same makes a certain number of revolutions per minute. On this spindle A is fixed a hollow ring wheel which is divided in two segments B and C by two slots D and D'.

In the closed position of the shutter S H the actuating lever E having pivoting point F rests with its pins H and H' inside the ring and opposite to the slot D.

For opening and putting into action the mechanism the free end of lever E is pressed down, then the pins H and H' pass through the slot D to the outside periphery of the ring, which when released comes into rotation, owing to the effect of the spring. During this rotation, the pin H' slides on the outer periphery of the ring segment C and keeps the screen open until the slot D' comes opposite to the pin which drops into the ring under the weight of the lever. After the screen is closed and the lever E is in a horizontal position, the pins H and H' slide inside the hollow ring which is rotating, and during which rotation the opening of the shutter is prevented by the ring segment B until the motion of the ring B is stopped, when the block G of the ring comes against the pins H and H'.

It will readily be seen that other instruments or appliances such as a mirror reflector, voltmeter, wattmeters, and the like may be combined with my selenium photometer, without the necessity of any substantial alteration, while the automatic device may be actuated by any suitable motive power.

What he claims and desires to secure by Letters Patent is:—

The improvements in photometers or apparatus for testing the intensity of light, comprising a timing device and a shutter in combination with a selenium cell, and current meter, whereby the selenium cell is exposed to the light rays for a certain period, and shut off for another period in the required proportions, substantially for the purpose herein set forth.

In testimony whereof he has affixed his signature, in presence of two witnesses.

THEODORE TORDA.

Witnesses:
  JOHN W. MACKENZIE,
  ALBERT JONES.